US012754316B2

(12) United States Patent
Kim

(10) Patent No.: US 12,754,316 B2
(45) Date of Patent: Oct. 6, 2026

(54) OBJECT TRACKING SYSTEM

(71) Applicant: FLOWTONIC CORP., Daejeon (KR)

(72) Inventor: Do Myung Kim, Daejeon (KR)

(73) Assignee: FLOWTONIC CORP., Daejeon (KR)

( * ) Notice: Subject to any disclaimer, the term of this patent is extended or adjusted under 35 U.S.C. 154(b) by 743 days.

(21) Appl. No.: 18/251,161

(22) PCT Filed: Oct. 6, 2021

(86) PCT No.: PCT/KR2021/013654
§ 371 (c)(1),
(2) Date: Apr. 28, 2023

(87) PCT Pub. No.: WO2022/092606
PCT Pub. Date: May 5, 2022

(65) Prior Publication Data

US 2023/0400581 A1 Dec. 14, 2023

(30) Foreign Application Priority Data

Oct. 30, 2020 (KR) ........................ 10-2020-0143191

(51) Int. Cl.
*G01S 17/66* (2006.01)
*G01S 7/481* (2006.01)
*G01S 7/484* (2006.01)

(52) U.S. Cl.
CPC ............ *G01S 17/66* (2013.01); *G01S 7/4817* (2013.01); *G01S 7/484* (2013.01)

(58) Field of Classification Search
CPC ......... G01S 17/66; G01S 7/4817; F16H 21/18
See application file for complete search history.

(56) References Cited

U.S. PATENT DOCUMENTS 3,644,043 A * 2/1972 Jones ...................... F41G 3/065 250/203.1
4,846,297 A * 7/1989 Field .................... G05D 1/0238 701/25
9,063,549 B1 * 6/2015 Pennecot ................ G01S 17/93
(Continued)

FOREIGN PATENT DOCUMENTS

CN 105093521 A * 11/2015
JP H05-248862 A 9/1993
(Continued)

OTHER PUBLICATIONS

Machine translation of CN-105093521-A. (Year: 2017).*
(Continued)

*Primary Examiner* — Yuqing Xiao
*Assistant Examiner* — Zhengqing Qi
(74) *Attorney, Agent, or Firm* — INNOVATION CAPITAL LAW GROUP, LLP; Vic Lin

(57) ABSTRACT

The present disclosure relates to an object tracking system having improved efficiency, as an object tracking system for emitting light pulses to an external tracking object including an optical sensor, the object tracking system comprising: one or more optical transmitting units configured to transmit an externally swept optical pulse; and a driving unit for adjusting an optical path of the light transmitting units, wherein the driving unit adjusts light emitted from the light transmitting units to be reciprocally swept within a predetermined angle range.

4 Claims, 15 Drawing Sheets

(56) References Cited

U.S. PATENT DOCUMENTS

| | | | | |
|---|---|---|---|---|
| 2018/0091018 | A1* | 3/2018 | Fritsch | A61C 17/3436 |
| 2019/0107623 | A1* | 4/2019 | Campbell | G01S 7/4865 |
| 2019/0154439 | A1* | 5/2019 | Binder | G01S 15/42 |
| 2019/0324147 | A1* | 10/2019 | Day | G01S 7/026 |

FOREIGN PATENT DOCUMENTS

| | | | |
|---|---|---|---|
| JP | 09-079817 | A | 3/1997 |
| KR | 10-2017-0106301 | A | 9/2017 |
| KR | 10-2017-0132884 | A | 12/2017 |
| KR | 10-2019-0099322 | A | 8/2019 |
| KR | 10-2233278 | B1 | 3/2021 |

OTHER PUBLICATIONS

International Search Report received in International Application No., PCT/KR2021/013654, mailed on Jan. 10, 2022, in 3 pages.

* cited by examiner

PRIOR ART

OBJECT TRACKING SYSTEM

TECHNICAL FIELD

The present disclosure relates to an object tracking system, and relates to an optical-based object tracking system for operating virtual reality (VR) or augmented reality (AR).

BACKGROUND ART

In order to operate virtual reality or augmented reality, high-level technologies related to recognition, detection, and tracking of an object are generally required. Among these technologies, the tracking technology tracks markers attached to objects, and currently well-known tracking technologies such as positional tracking and mapping for small AR workspaces (PTAM) or simultaneous localization and mapping (SLAM) are configured to place a camera and install track markers on surrounding walls.

However, the tracking technology using the camera has a problem in that the price and weight increase as a higher-spec lens is required for precise tracking, and as a result, the overall weight of the final equipment also increases, leading to deterioration in marketability. Accordingly, Korean Patent Laid-open Publication No. 10-2017-0106301 ("Position Tracking System and Method," published on Sep. 20, 2017, hereinafter referred to as 'related art') disclosed tracking technology including two orthogonal rotors emitting fan-shaped laser beams. In this case, as illustrated in FIG. 1, the related art discloses a technology for increasing a tracking volume and tracking precision while minimizing an increase in weight of a device, including a transmitting unit emitting laser light pulses and a receiving unit including an optical sensor.

However, the transmission unit of the related art has a limitation in that it may irradiate only an area of up to 180° as light pulses swept in X and Y axes through a horizontal rotor and a vertical rotor are rotated in one direction, and has a disadvantage in that its efficiency is lowered because it is covered by the device when light is emitted to the rest area.

DISCLOSURE

Technical Problem

An object of the present disclosure provides an object tracking system capable of maximizing efficiency of a device through an optical transmitting unit that is reciprocally rotated and swept bidirectionally.

Technical Solution

In one general aspect, an object tracking system for emitting light pulses to an external tracking object including an optical sensor includes: one or more optical transmitting units configured to emit light pulses to the outside; and a driving unit configured to adjust an optical path of the optical transmitting unit, in which the driving unit adjusts light emitted from the light transmitting units to be reciprocally swept within a predetermined angle range.

The driving unit may further include a power generation unit configured to generate mechanical power, and a control unit configured to control the power generation unit.

The power generation unit may be a DC motor driven with an angular velocity ω.

The driving unit may include: a converting member configured to convert rotational force of the power generation unit into a linear motion; and a connecting member configured to connect the optical transmitting unit and the converting member to transmit power to the optical transmitting unit.

The optical transmitting unit may be rotated around a pivot, one end of the optical transmitting unit may be connected to the connecting member, and when the power generation unit is rotated in one direction, the other end of the optical transmitting unit may reciprocate within a predetermined angle range.

The object tracking system may further include: a rotating member configured to be driven along a rotation path of radius R from a rotation center G1 of the power generation unit, in which the converting member and the connecting member may be moved by a displacement S in a first axis (x-axis) around the pivot according to a position of the rotating member (Where −R≤S≤R).

The object tracking system may further include a control unit configured to control the driving unit, in which the control unit may calculate a sweep angle ψ rotated by the other end of the optical transmitting unit by the following Equation.

$$\Psi = \tan^{-1}\left(\frac{R}{P}\sin(\omega t)\right)$$

(Where

ψ=Sweep angle of other end of optical transmitting unit around pivot,

R=Radius of rotation of rotating member,

P=Displacement of pivot to second axis (y-axis) based on G1 of power generation unit, ω=Angular velocity of power generation unit=2π*Frequency, and t=Operating time of power generation unit.)

The power generation unit may be a servo motor whose direction is changed within a predetermined angle range.

The object tracking system may further include: a control unit configured to control the driving unit, in which the optical transmitting unit may have a sweep angle ψ within a predetermined angle range, and the control unit may calculate the sweep angle ψ by converting control data for the driving unit into a periodic function.

The control unit may calculate the sweep angle ψ based on a time difference between a time when the optical transmitting unit detects an object when sweeping in one direction and a time when the optical transmitting unit detects an object when sweeping in another direction.

The light pulses emitted from the optical transmitting unit may include a data bit and a sweep bit, and the sweep bit may include an up sweep bit generated when the optical transmitting unit is rotated in one direction within a predetermined angle range and a down sweep bit generated when the optical transmitting unit is rotated in another direction within the predetermined angle range.

The number of optical transmitting units may be plural, the plurality of optical transmitting units may emit the light pulses swept on different axes, and the light pulses of the optical transmitting unit may further include an axis bit which is data for the swept axis.

The light pulses of the optical transmitting unit may be emitted at regular intervals, and one or more light pulses emitted from another optical transmitting unit may be disposed between two light pulses emitted from the one optical transmitting unit.

Advantageous Effects

The object tracking system of the present disclosure according to the configuration as described above may emit more light pulses for a certain area as it solves the disadvantage of not being emitted in the existing blind spot area through the optical transmitting unit that sweeps bidirectionally, and as a result, it is possible to further increase the efficiency of the device.

In addition, the object tracking system of the present disclosure may easily obtain related information such as the type and attitude of the current optical transmitting unit as the plurality of optical transmitting units alternately transmit the light pulses containing the plurality of pieces of information, and as a result, it is possible to increase the computational speed of the entire system.

BEST MODE

Figure 1:
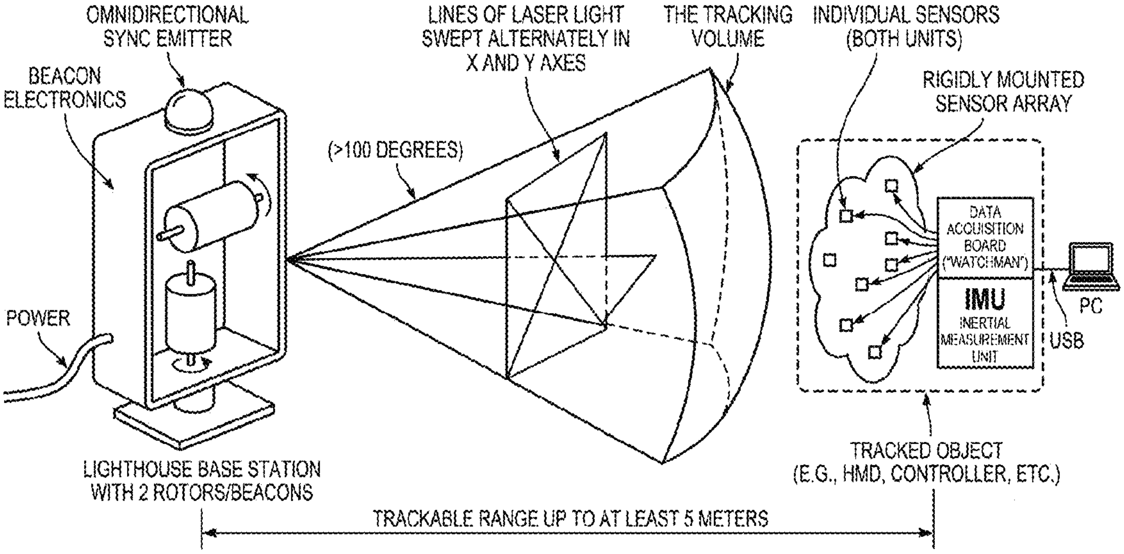
FIG. 1 is a schematic diagram of a position tracking system according to the related art.

Hereinafter, an object tracking system according to the present disclosure will be described in detail with reference to the accompanying drawings. The drawings to be provided below are provided by way of example so that the spirit of the present disclosure can be sufficiently transferred to those skilled in the art. Therefore, the present disclosure is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present disclosure pertains unless otherwise defined, and a description for the known function and configuration unnecessarily obscuring the gist of the present disclosure will be omitted in the following description and the accompanying drawings.

Figure 2A:
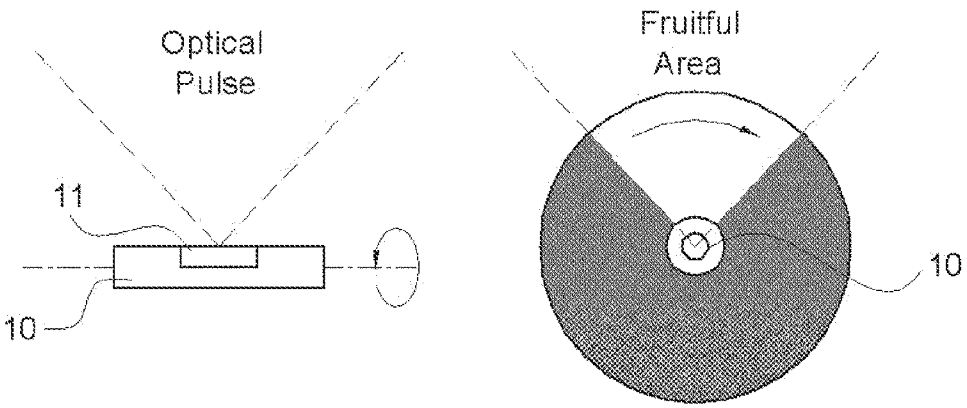
FIGS. 2A and 2B are comparison diagrams of the related art and a tracking system according to the present disclosure.
Figure 2B:
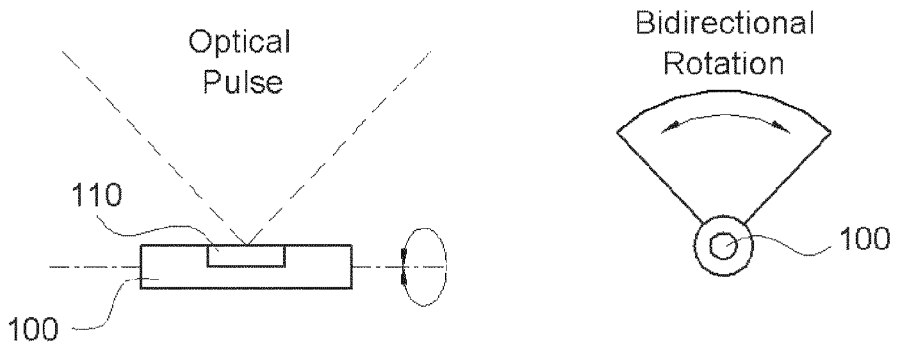

FIG. 2 is a comparison diagram of the related art and a tracking system according to the present disclosure, FIG. 2A is a schematic diagram of a front view and a side view of an optical transmitting unit according to the related art, and FIG. 2B is a front view and a side view of the optical transmitting unit according to the present disclosure, respectively.

Referring to FIG. 2A, the conventional optical transmitting unit 10 emits fan-shaped light pulses (optical pulse) to the outside through a discharge port 11, and the conventional optical transmitting unit 10 is configured to be rotated in one direction. In this case, the conventional optical transmitting unit 10 has a problem in that the case where the light pulses are emitted to one side that is open is a fruitful area, and in areas other than the fruitful area, emission of light pulses to the outside is limited due to other devices or housings.

Accordingly, as illustrated in FIG. 2B, the object tracking system of the present disclosure may include an optical transmitting unit 100 that is rotated bidirectionally. Accordingly, there is an advantage in that the optical transmitting unit 100 may continuously emit the light pulses to the open fruitful area, and compared to the related art, more light pulses than an equivalent rotational motion may emit to an optical sensor of a tracking object disposed outside.

Figure 3:
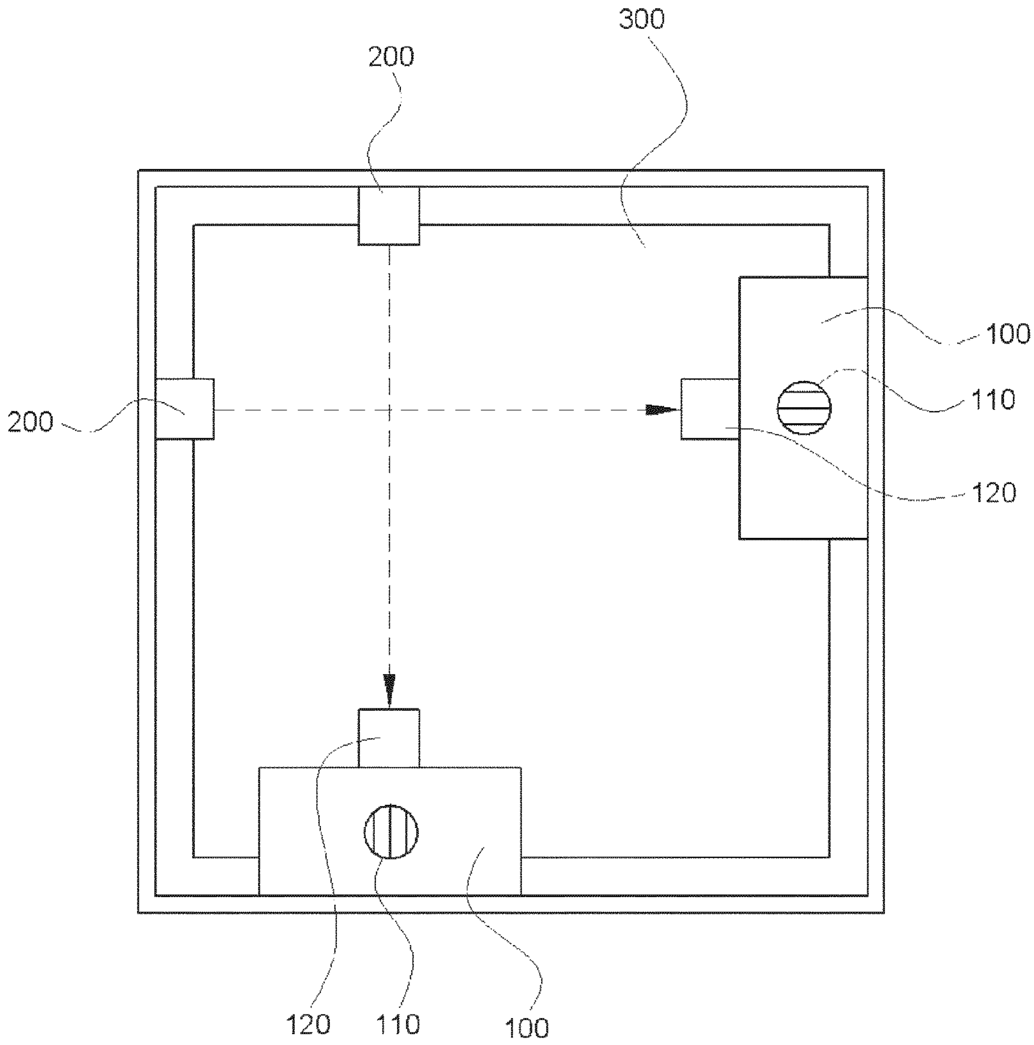
FIG. 3 is a diagram an optical transmitting unit according to the present disclosure.

FIG. 3 is an object tracking system according to an embodiment of the present disclosure, and FIG. 3 is a schematic diagram illustrating an object tracking system including an optical transmitting unit that is rotated bidirectionally.

Referring to FIG. 3, the present disclosure may include one or more optical transmitting units 100, and may include a plurality of optical transmitting units 100 disposed on different axes. In this case, there may be various forms that the plurality of optical transmitting units 100 may be disposed to be orthogonal to each other, a plurality of light receiving units 100 are disposed on one axis, or the like. In addition, the object tracking system of the present disclosure may further include a light emitting diode 200, and a discharge port 110 and a receiving port 120 may be formed on the optical transmitting unit 100. In this case, as light irradiated from the light emitting diode 200 is introduced into the receiving port 120 of the optical transmitting unit 100 and is changed in direction through a lens disposed inside the optical transmitting unit 100, the light may be irradiated to the outside through the discharge port 110.

The object tracking system of the present disclosure may further include a control unit 300. The control unit 300 is composed of a micro controller unit (MCU), etc., to generate a control signal to control driving of the optical transmitting unit 100 or control data to be included in light pulses emitted from the optical transmitting unit 100.

Figure 4:
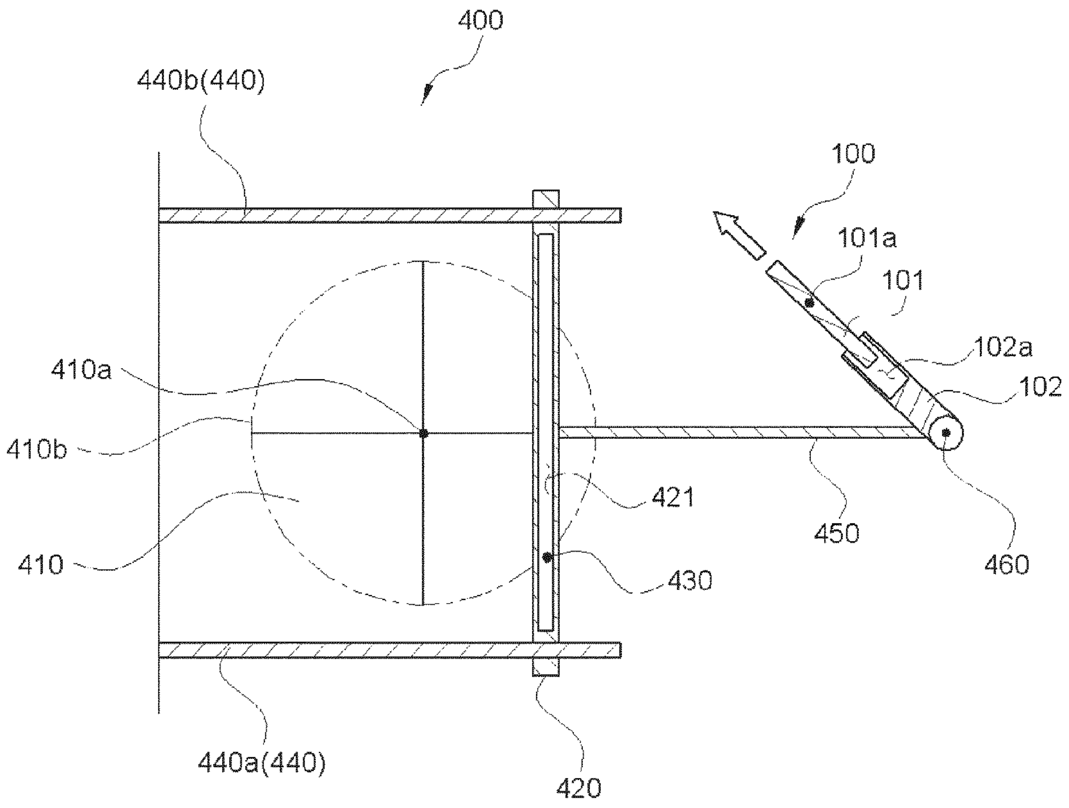
FIGS. 4 to 6 are diagrams illustrating the optical transmitting unit and a driving unit according to the present disclosure.
Figure 5:
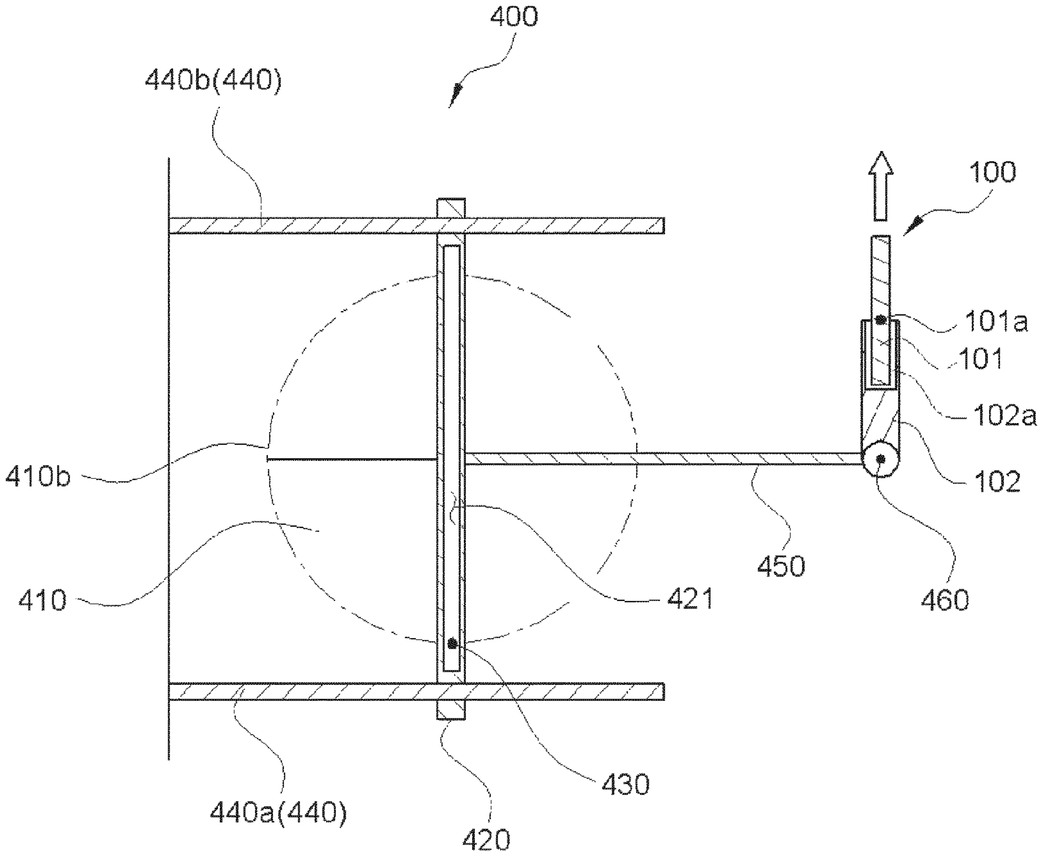
Figure 6:
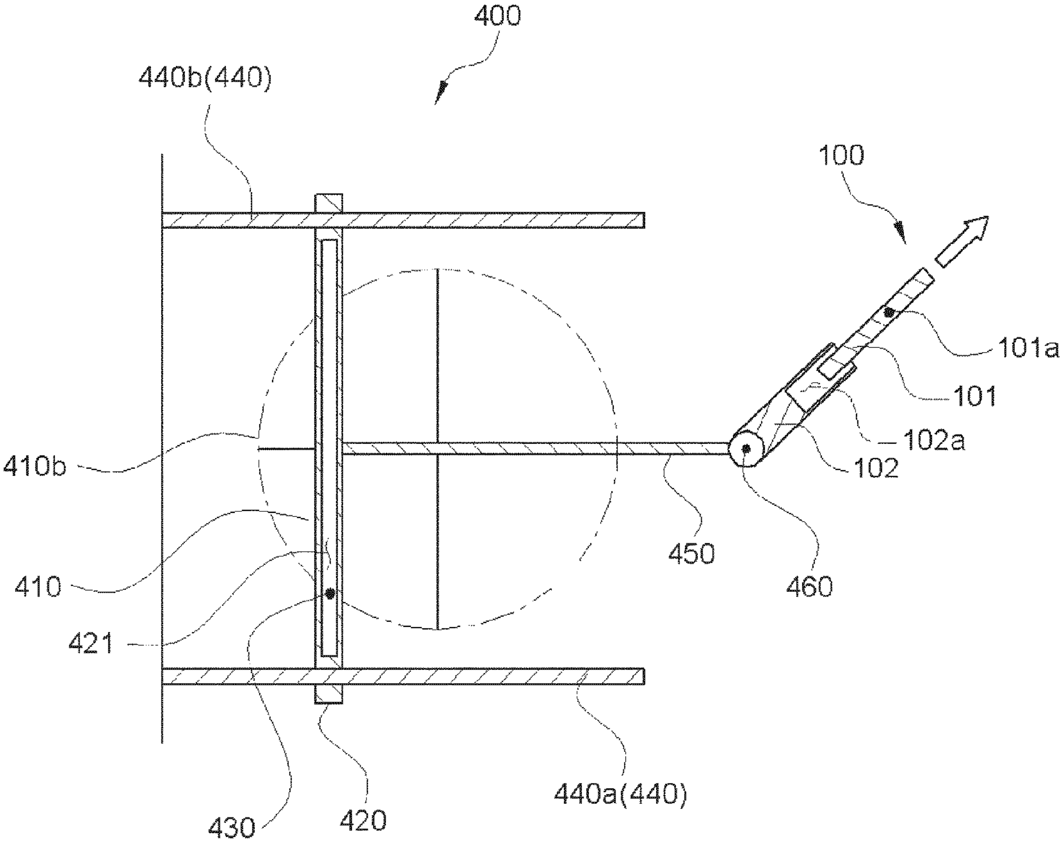

FIGS. 4 to 6 are an object tracking system according to an embodiment of the present disclosure, and FIGS. 4 to 6 sequentially illustrate an optical transmitting unit that is controlled bidirectionally.

Referring to FIGS. 4 to 6, the object tracking system of the present disclosure may further include a driving unit 400 that adjusts an attitude of the optical transmitting unit 100. In this case, the driving unit 400 may include a power generation unit 410. Here, when the power generation unit 410 is a DC motor rotating in one direction, the driving unit 400 further includes a converting member 420 that converts a rotation in one direction into a linear motion, and thus, due to the linear motion of the converting member 420, the optical transmitting unit 100 may be controlled to perform a bi-directional sweep motion. In addition, the power generation unit 410 may be composed of a servo motor and directly connected to the optical transmitting unit 100, and the servo motor may be rotated bidirectionally to control a rotation angle of the optical transmitting unit 100. When the power generation unit 410 is a servo motor, the power generation unit 410 may further include an inertial measurement unit (IMU), an encoder, or a revolver to measure the rotational speed or rotational angle of the servo motor. Alternatively, the rotation angle corresponding to a PWM input value may be output for a specific load of the servo motor based on a previously input data table.

The driving unit 400 in which the power generation unit 410 is a DC motor will be described in detail as follows. The driving unit 400 according to the present disclosure may include a power generation unit 410, a converting member 420, a rotating member 430, a guide rod 440, a connecting member 450, and a hinge member 460. In this case, the rotating member 430 may be connected to the power generation unit 410 and rotated while drawing a rotation path 410*b* of a certain radius based on the rotation center 410*a*. The converting member 420 may be connected to the rotating member 430, and has a guide groove 421 formed inside the converting member 420 to receive the driving force of the rotating member 430.

If horizontal directions in the drawing is defined as a first axis and a vertical direction as a second axis, when the position of the rotating member 430 rotating on the up, down, left and right planes is changed, the converting member 420 is moved to the left and right, but a posture of the converting member 420 may be maintained. In this case, the guide rod 440 may be connected to the converting member 420 to maintain the posture of the converting member 420. That is, the converting member 420 is provided with holes having the guide rods 440 inserted thereinto and communicating left and right, and the hole of the converting member 420 and the guide rod 440 have diameters in a vertical arc direction corresponding to each other and thus restrict rotation while limiting movement in directions other than the horizontal direction. Here, the guide rod 440 may be formed in plural, including a first guide rods 440*a* and second guide rods 440*b*, and the guide rods may be spaced apart from each other in the vertical direction. In the converting member 420, the hole into which the first guide rod 440*a* is inserted may be disposed above the guide groove 421, and the hole into which the second guide rod 440*b* is inserted may be disposed below the guide groove 421.

The connecting member 450 may be coupled to the converting member 420 and moved linearly, and one end of the connecting member 450 may be connected to the converting member 420 and the other end thereof may be connected to one end of the optical transmitting unit 100. In this case, the other end of the connecting member 450 and one end of the optical transmitting unit 100 may be hinged to each other through a hinge member 460.

The optical transmitting unit 100 may be formed with a length at both ends thereof, and may have a form in which a plurality of bodies including a first body 101 and a second body 102 are coupled along both ends. In addition, the first body 101 and the second body 102 may have a shape in which the entire length of the optical transmitting unit 100 is variable. For example, an insertion groove 102*a* may be formed in the second body 102 and inserted into the first body 101. In this case, a pivot 101 may be disposed so that a central portion of the first body 101 is not moved in up, down, left, and right directions. In addition, when one end of the second body 102 is connected to the other end of the connecting member 450 and the position of one end is changed to the left and right, power may be transmitted from the second body 102 to the first body 101. Here, as the central portion of the first body 101 is fixed to the pivot 101, the first body 101 may be converted into a shape that is rotated around the pivot 101.

Figure 7:
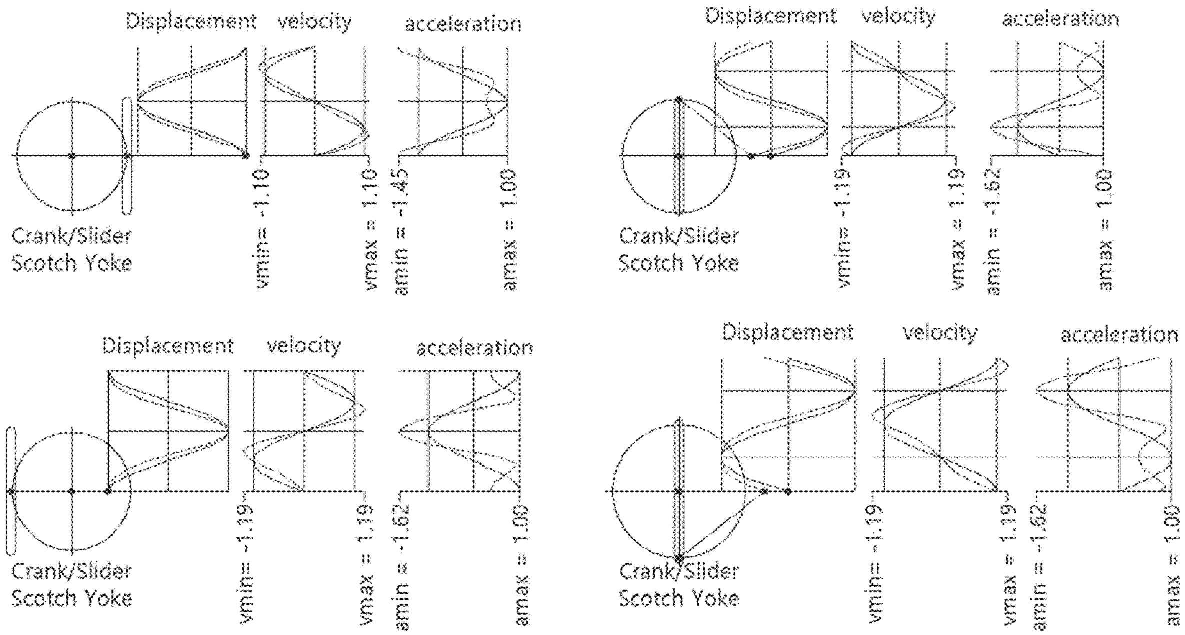
FIG. 7 is a diagram illustrating a scotch yoke mechanism applied to the present disclosure.
Figure 8:
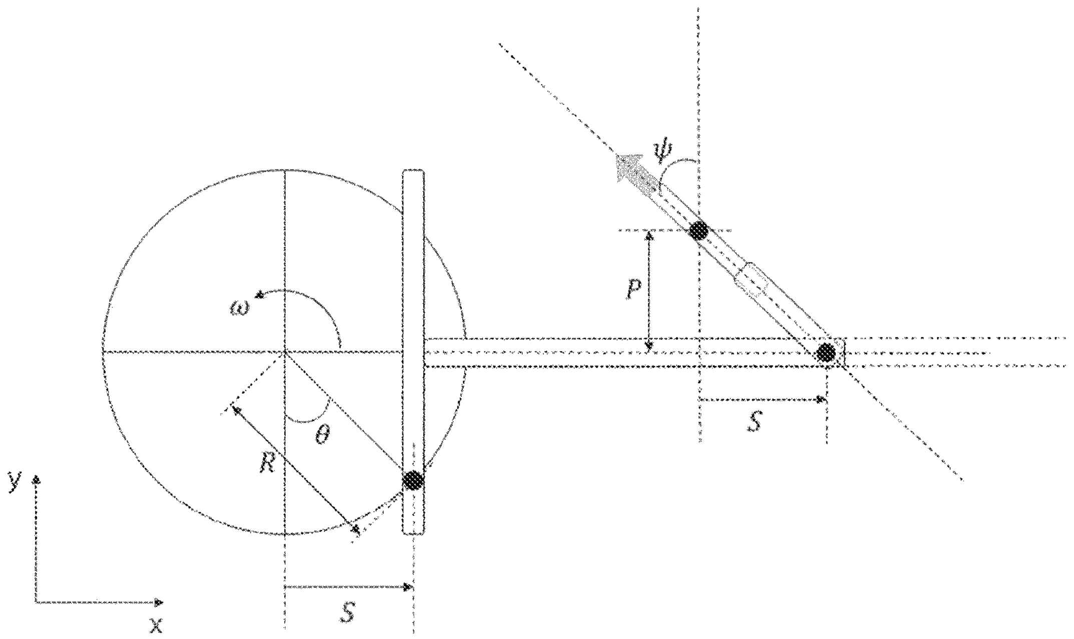
FIGS. 8 to 9 are schematic diagrams illustrating the optical transmitting unit and the driving unit according to the present disclosure.
Figure 9:
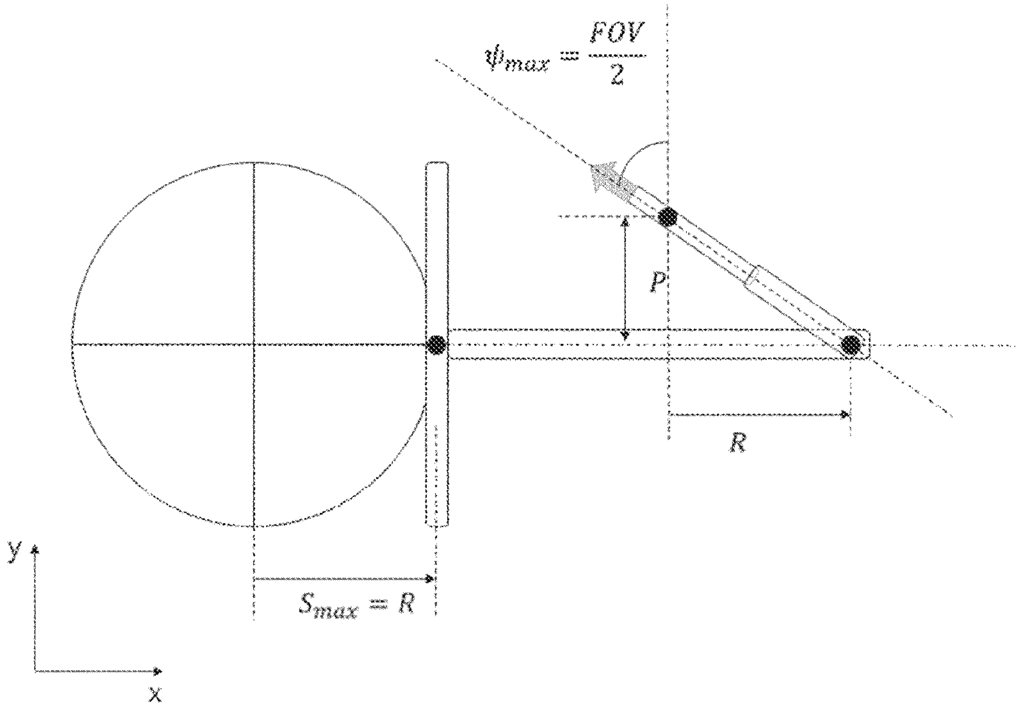
Figure 10A:
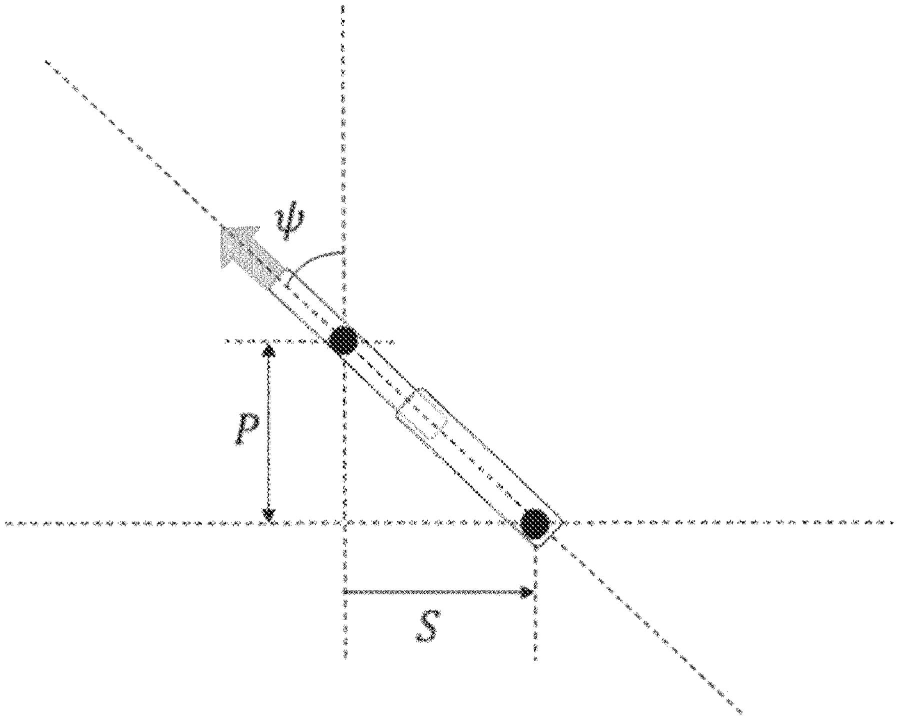
FIGS. 10A and 10B are schematic diagrams illustrating the optical transmitting unit according to the present disclosure and a graph showing the amount of change in sweep angle and displacement over time.
Figure 10B:
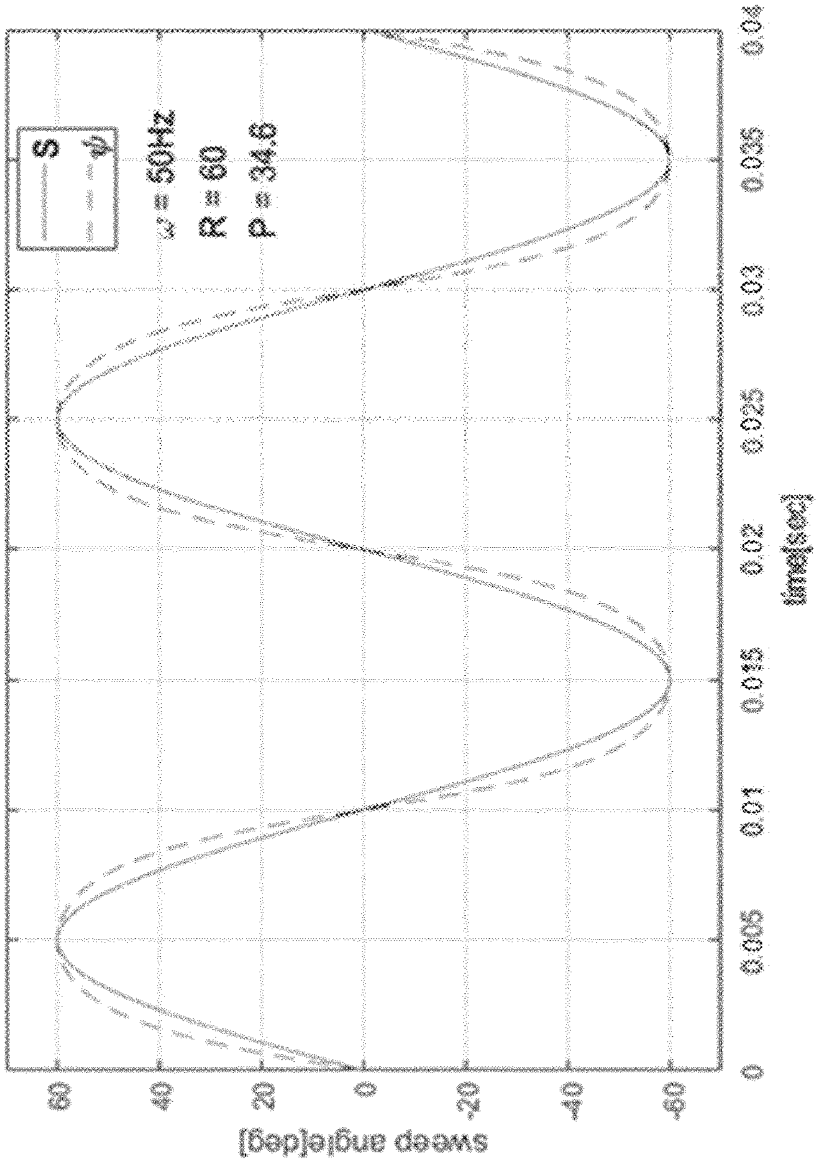

FIG. 7 illustrates the object tracking system according to the embodiment of the present disclosure, and is a diagram illustrating a scotch yoke mechanism applied to the present disclosure, and FIGS. 8 and 9 are schematic diagrams illustrating the optical transmitting unit and the driving unit, and FIG. 10 is a schematic diagram illustrating the optical transmitting unit and illustrates a graph according to the amount of change in sweep angle and displacement over time.

Referring to FIG. 7, as the rotational force of the power generation unit 410 is converted into the linear motion of the converting member 420 and the connecting member 450 through the crank motion, the driving unit 400 may draw constant waveforms over time in the displacement of the converting member 420 and the connecting member 450 in the horizontal directions by the power generation unit 410 rotating at a constant angular velocity. In addition, since velocity and acceleration components of the converting member 420 and the connecting member 450 can also be calculated, a rotation angle of the optical transmitting unit 100 can be calculated through a preset algorithm.

Hereinafter, in order to more clearly describe the algorithm for calculating the rotation angle of the optical transmitting unit 100 in FIGS. 8 to 10, it will be described with reference to the configuration and codes in FIGS. 4 to 6 described above. Here, the above-described first axis is replaced with an x-axis and the second axis is replaced with a y-axis.

Referring to FIG. 8, the power generation unit 410 may be rotated at an angular velocity ω in an x-y axis plane, and the rotating member 430 may be rotated along a rotation path 410*b* of a radius of rotation R based on the rotation center 410*a* of the power generation unit 410. In addition, the converting member 420 receiving the power of the rotating member 430 may move the rotation center 410*a* of the power generation unit 410 by a displacement S in the x-axis around a reference line extending in the y-axis. In addition, the connecting member 450 connected to the converting member 420 may also be moved by the displacement S in the x-axis. In this case, a pivot 101*a* of the optical transmitting unit 100 may be spaced apart from the rotation center 410*a* of the power generation unit 410 by a separation distance P in the y-axis.

A line connecting the rotating member 430 and the rotation center 410*a* of the power generation unit 410 may have a reference line, which is a y-axis component of the rotation center 410*a*, and a predetermined rotation angle θ, and the rotation angle θ may change from 0° to 360° by rotating in one direction, and may be reset from 360° to 0°. In this case, the displacement S may be calculated through Relational Expression 1 below

[Relational Expression 1]

$$S = R \times \sin\theta$$

In addition, the other end of the optical transmitting unit 100 may be rotated by a sweep angle ψ within a predetermined angle range around the pivot 101*a*, and the sweep angle ψ may be calculated through Relational Expression 2 below.

[Relational Expression 2]

$$\Psi = \tan^{-1}\left(\frac{S}{P}\right)$$

Referring to FIG. 9, the sweep angle ψ may be controlled within a required field of view (FOV). In this case, when the optical transmitting unit 100 is rotated by the same angle in the x-axis and −x-axis around the line extending in the y-axis of the pivot 101_a_, the maximum value of the sweep angle ψ rotating in one direction may be given the condition of Relational Expression 3 below.

[Relational Expression 3]

$$\Psi_{max} = \frac{FOV}{2}$$

In this case, the y-axis separation distance P between the pivot 101_a_ of the optical transmitting unit 100 and the rotation center 410_a_ of the power generation unit 410 may be calculated by Relational Expression 4 below.

[Relational Expression 4]

$$P = \frac{R}{\tan\frac{FOV}{2}}$$

In this way, by the method for increasing emission efficiency to an outside of the optical transmitting unit 100, the optimal structure may be calculated through the Relational Expression between the required FOV, which is a given condition, and the radius of rotation R of the rotating member 430.

Referring to FIG. 10, given the angular velocity ω or the frequency component through the other end of the optical transmitting unit 100 connected to the converting member 420 and the connecting member 450 and moved by the displacement S in the x-axis, and the y-axis separation distance P between the other end of the optical transmitting unit 100 and the pivot 101_a_, the change in the sweep angle ψ of the other end side of the optical transmitting unit 100 over time may be calculated as shown in Relational Expression 5 below.

[Relational Expression 5]

$$\psi = \tan^{-1}\left(\frac{S}{P}\right)$$

In addition, the separation distance P is a fixed value, and Relational Expression 6 expressing the displacement S along the x-axis, which changes over time, as a component for each time is as follows.

[Relational Expression 6]

$$\psi = \tan^{-1}\left(\frac{R}{P}\sin(\omega t)\right) = \tan^{-1}\left(\frac{R}{P}\sin(2\pi f t)\right)$$

The maximum and minimum angles of the sweep angle ψ may be controlled and calculated through the radius of rotation R and the separation distance P, and the reciprocating speed may be varied or calculated through the angular velocity ω of the power generation unit 410, so it is possible to operate the plurality of optical transmitting units 100 more efficiently.

Figure 11:
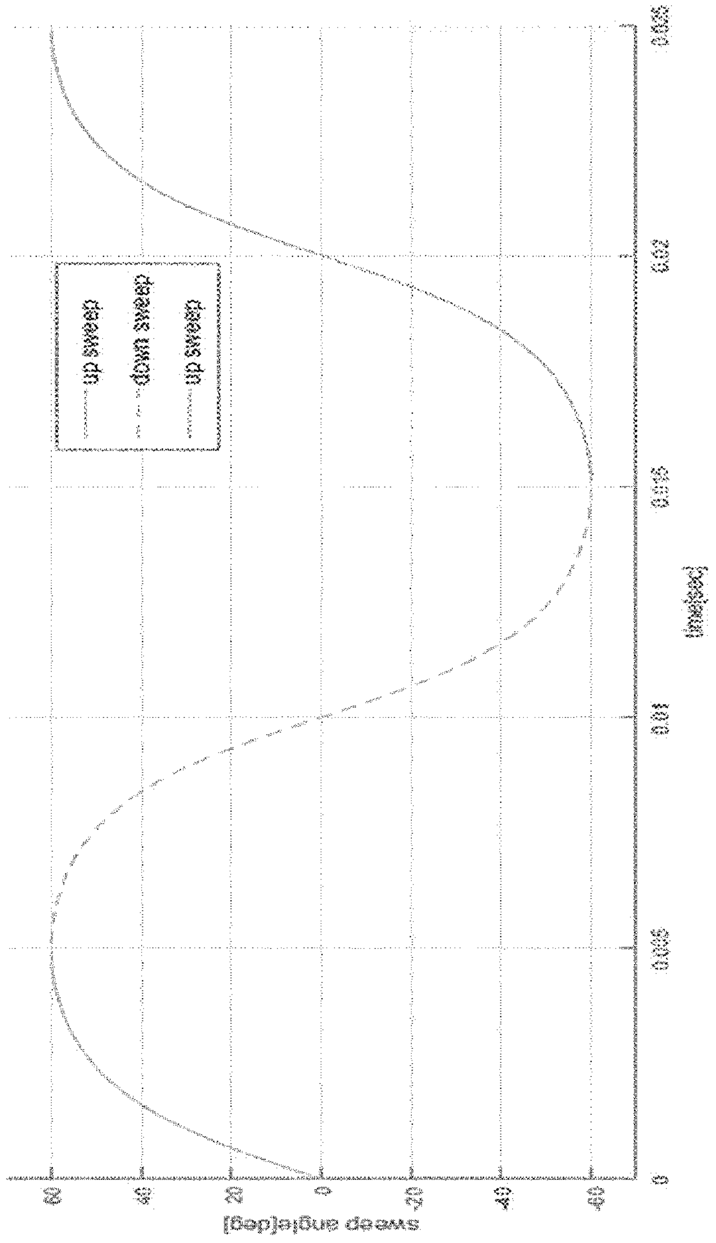
FIGS. 11 and 12 are graphs showing the amount of change in sweep angle over time according to the present disclosure.
Figure 12:
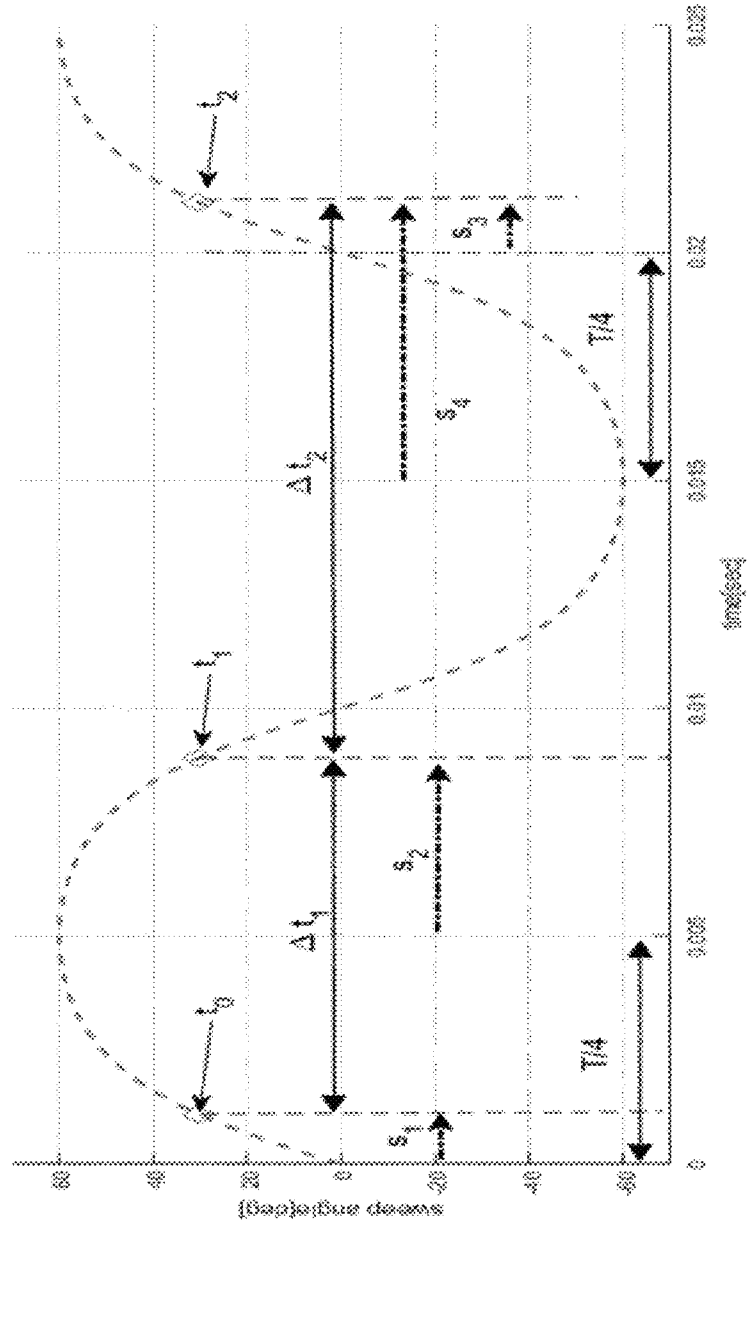

FIGS. 11 and 12 illustrate an object tracking system according to an embodiment of the present disclosure, and FIGS. 11 and 12 are graphs showing the amount of change in sweep angle over time according to the present disclosure.

Referring to FIG. 11, the sweep angle ψ of the optical transmitting unit 100 may be varied within a predetermined angle range, and the trend of the sweep angle ψ of the optical transmitting unit 100 over time may be calculated by the above Relational Expression 6. In this case, as illustrated, the optical transmitting unit 100 that reaches the maximum angle in one direction is rotated in another direction, and when the optical transmitting unit 100 reaches the maximum angle in the other direction, the optical transmitting unit 100 may be rotated again in one direction. In this case, when the rotation from one direction to another direction is defined as down sweep and the rotation from another direction to one direction is defined as up sweep, the optical transmitting unit 100 may alternate the up sweep and down sweep at regular intervals.

Referring to FIG. 12, it may be defined that the optical transmitting unit 100 repeats the up sweep and down sweep in a predetermined angle range between −60° and 60°, and that the object is located within a predetermined angle range between −60° and 60° of the light pulses emission path. In this case, in the object tracking system of the present disclosure, when the sweep angle ψ of the optical transmitting unit 100 is A ° (located between −60° and 60° according to the above definition), the light pulses may reach the object and thus recorded and calculated. In addition, the optical transmitting unit 100 has the advantage of being able to emit more light pulses in a short time as the sweep angle ψ may exceed 30° in the case of the up sweep and the down sweep. In addition, the alternating value of the up sweep and the down sweep where the sweep angle ψ is located at 30° may be instantaneously measured, and through the detected time difference, the present disclosure may calculate a more accurate sweep angle ψ through Relational Expression 7 below.

[Relational Expression 7]

$$\psi = \tan^{-1}\left(\frac{R}{P}\sin(2\pi f s_1)\right) = \tan^{-1}\left(\frac{R}{P}\sin(2\pi f s_2)\right)$$

$$\psi = \tan^{-1}\left(\frac{R}{P}\sin(2\pi f s_3)\right) = \tan^{-1}\left(\frac{R}{P}\sin(2\pi f s_4)\right)$$

(Where:

$$S_1 = \frac{T}{4} - \frac{\Delta t_1}{2},\ S_2 = \frac{\Delta t_1}{2},\ S_3 = \frac{\Delta t_2}{2} - \frac{T}{4},\ S_4 = \frac{\Delta t_2}{2})$$

T may be a rotation period of the optical transmitting unit 100. As the plurality of pieces of information is acquired in this way, the object tracking system of the present disclosure has the advantage of enabling more accurate location detection.

As such, the present disclosure may calculate the sweep angle ψ of light emitted by including the driving unit 400 that adjusts the optical path of the optical transmitting unit 100, and in addition to an arctangent in calculating the sweep angle ψ, periodic functions such as sine or cosine may be used. As another example, the optical path of the optical transmitting unit 100 may be adjusted through MEMS mirror adjustment, and in the case of using the MEMS mirror, the sweep angle ψ may be expressed as a sine function.

Figure 13:
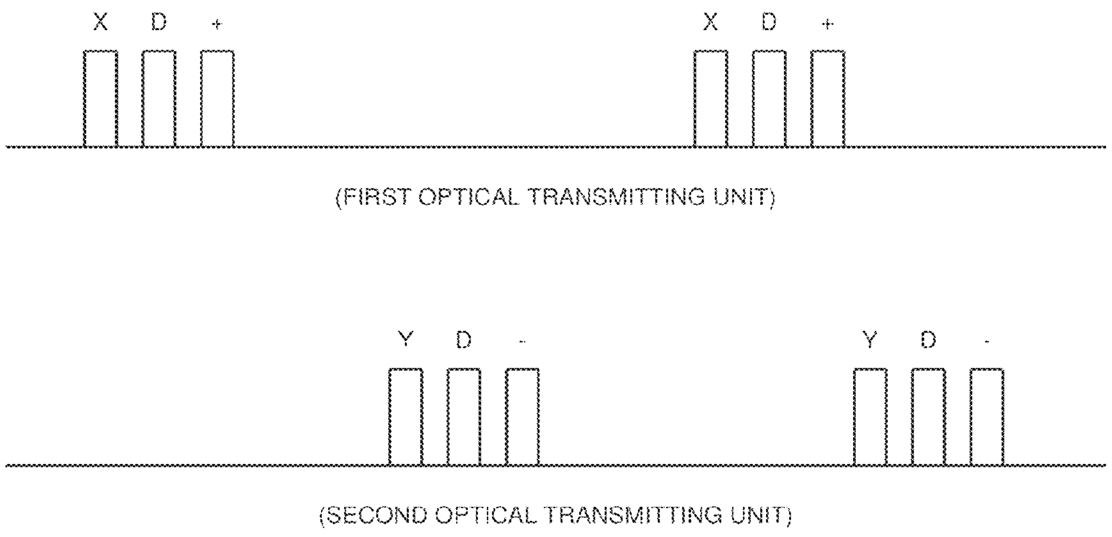
FIG. 13 is a diagram illustrating signals of light pulses emitted from two optical transmitting units according to the present disclosure.

FIG. 13 is an object tracking system according to an embodiment of the present disclosure, and FIG. 13 is a diagram illustrating signals of light pulses emitted from two optical transmitting units.

Referring to FIG. 13, the optical transmitting unit 100 may emit light pulses to the outside, and the light pulses may include a data bit and a sweep bit. In this case, the light pulses are beams emitted at regular intervals, and the data bit and the sweep bit may be a single bit or a bit string composed of multiple bits. The sweep bit may include the up sweep bit generated when the optical transmitting unit is rotated in one direction within a predetermined angle range and the down sweep bit generated when the optical transmitting unit is rotated in another direction within the predetermined angle range. In this case, when the sweep bit is the single bit, the up sweep bit and the down sweep bit may be either 1 or 0, respectively.

In addition, the object tracking system of the present disclosure may include a plurality of optical transmitting units 100 disposed on different axes, and at least one of the plurality of optical transmitting units 100 may further include an axis bit. The axis bit may be data for an axis on which each of the optical transmitting units 100 is disposed. In this case, the axis bit may also be a single bit or a bit string composed of multiple bits, and in the case of the single bit, one optical transmitting unit 100 disposed on one axis may be set to 1, and another optical transmitting unit 100 disposed on another axis may be set to 0. Accordingly, the optical transmitting unit 100 may emit light pulses including the above data bit, sweep bit, and axis bit at regular intervals, and may be controlled so that one or more light pulses emitted from another optical transmitting unit are disposed between two light pulses emitted from one optical transmitting unit 100. Accordingly, even if a lot of data is transmitted in a short period of time, it can lead to an advantage that an information operation becomes easier as data for identifying each is included. In addition, even if the plurality of optical transmitting units 100 are directed to the same point on a two-dimensional plane, the receiving unit may time-divide and receive each axis so that each axis may be distinguished, while as the type of optical transmitting unit is also classified in the receiving unit, it is possible to resolve axial ambiguity.

Hereinabove, although the present disclosure has been described by specific matters such as specific components, the exemplary embodiments, and the accompanying drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to these exemplary embodiments, but the claims and all of modifications equal or equivalent to the claims are intended to fall within the scope and spirit of the present disclosure.

DESCRIPTION OF REFERENCE SIGNS

100: Optical transmitting unit
101: First body
101*a*: Pivot
102: Second body
102*a*: Insertion groove
110: Discharge port
120: Receiving port
200: Light emitting diode
300: Control unit
400: Driving unit
410: Power generation unit
410*a*: Rotation center
410*b*: Rotation path
420: Converting member
421: Guide groove
430: Rotating member
440: Guide rod
440*a*: First guide rod
440*b*: Second guide rod
450: Connecting member
460: Hinge member

The invention claimed is:

1. An object tracking system for emitting light pulses to an external tracking object including an optical sensor, the object tracking system comprising:
one or more optical transmitting units configured to emit light pulses to the outside;
a driving unit configured to adjust an optical path of the one or more optical transmitting units; and
a control unit configured to control the driving unit;
wherein the driving unit adjusts light emitted from one or more optical transmitting units to be reciprocally swept within a predetermined angle range;
wherein the one or more optical transmitting units have a sweep angle ψ within the
predetermined angle range, and the control unit calculates the sweep angle ψ by converting control data for the driving unit into a periodic function;
wherein the control unit calculates the sweep angle ψ based on a time difference between a time when the one or more optical transmitting units detect the external tracking object when sweeping in one direction and a time when the one or more optical transmitting units detect the external tracking object when sweeping in another direction.

2. The object tracking system of claim 1, wherein the light pulses emitted from the one or more optical transmitting units include a data bit and a sweep bit, and the sweep bit includes an up sweep bit generated when the one or more optical transmitting units is rotated in one direction within the predetermined angle range and a down sweep bit generated when the one or more optical transmitting units is rotated in another direction within the predetermined angle range.

3. The object tracking system of claim 1, wherein the number of optical transmitting units is plural, the plurality of optical transmitting units emits the light pulses swept on different axes, and the light pulses of the plurality of optical transmitting units further include an axis bit which is data for a swept axis.

4. The object tracking system of claim 3, wherein the light pulses of one of the plurality of optical transmitting units are emitted at regular intervals, and one or more light pulses emitted from another one of the plurality of optical transmitting units are disposed between two light pulses emitted from the one of the plurality of optical transmitting units.

* * * * *